(12) United States Patent
Gan et al.

(10) Patent No.: US 9,247,483 B2
(45) Date of Patent: Jan. 26, 2016

(54) METHOD AND SYSTEM FOR DATA TRAFFIC OFFLOAD

(71) Applicant: Industrial Technology Research Institute, Hsinchu (TW)

(72) Inventors: Chai-Hien Gan, Hsinchu (TW);
Shin-Tsung Yang, Hsinchu (TW);
Yung-Chun Lin, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 224 days.

(21) Appl. No.: 13/727,611

(22) Filed: Dec. 27, 2012

(65) Prior Publication Data

US 2014/0161029 A1  Jun. 12, 2014

(30) Foreign Application Priority Data

Dec. 10, 2012  (TW) .............................. 101146418 A (51) Int. Cl.
*H04L 1/00* (2006.01)
*H04W 40/36* (2009.01)

(52) U.S. Cl.
CPC ..................................... *H04W 40/36* (2013.01)

(58) Field of Classification Search
CPC ......... H04L 47/10; H04L 47/11; H04L 47/12; H04L 47/13; H04L 47/14; H04L 47/30; H04L 65/00; H04L 65/01; H04L 65/02; H04L 65/03; H04L 2012/64; H04L 2012/65; H04L 2012/66; H04L 2012/67
USPC ......... 370/328, 329, 330, 331, 351, 355, 356, 370/229, 230
See application file for complete search history.

(56) References Cited

U.S. PATENT DOCUMENTS

| | | | |
|---|---|---|---|
| 8,189,606 B2 | 5/2012 | Leroy et al. | |
| 2010/0097995 A1 | 4/2010 | Murphy et al. | |
| 2010/0272013 A1 | 10/2010 | Horn et al. | |
| 2011/0170469 A1 | 7/2011 | Watfa et al. | |
| 2011/0182249 A1 | 7/2011 | Yang et al. | |
| 2011/0228750 A1 | 9/2011 | Tomici et al. | |
| 2011/0235546 A1* | 9/2011 | Horn et al. ..................... 370/254 |
| 2012/0039323 A1 | 2/2012 | Hirano et al. | |
| 2012/0093036 A1 | 4/2012 | Liu et al. | |

FOREIGN PATENT DOCUMENTS

WO        2009135611        11/2009

OTHER PUBLICATIONS

"Office Action of Taiwan Counterpart Application", issued on Sep. 25, 2014, p. 1-p. 12.

(Continued)

*Primary Examiner* — Dady Chery
(74) *Attorney, Agent, or Firm* — Jianq Chyun IP Office (57) ABSTRACT

A method and a system for data traffic offload are provided. The method includes the following steps. Create a local tunnel between a first base station and a second base station according to a first record and/or a second record. The first base station and the second base station are located on a front-end network. The first record corresponds to a first user equipment and the first base station. The second record corresponds to a second user equipment and the second base station. Route network packets transmitted between the first user equipment and the second user equipment via the local tunnel.

41 Claims, 8 Drawing Sheets

(56) References Cited

OTHER PUBLICATIONS

Hiroki Date, et al., "An Offload Method for Traffic Distribution based on Service Identification", IEEE International Conference on Networks (ICON), Dec. 2011, pp. 316-321.

Longjiao MA, et al., "Policy based Traffic Offload Management Mechanism in H(e)NB Subsystem", IEEE Network Operations and Management Symposium (APNOMS), Sep. 2011, pp. 1-6.

Longjiao MA, et al., "Traffic Offload Mechanism in EPC based on Bearer Type", IEEE International Conference on Wireless Communications, Networking and Mobile Computing (WiCOM), Sep. 2011, pp. 1-4.

Huarui Liang, et al., "How to Support Local IP Access from the Femto cell", IEEE International Conference on Communications Technology and Applications, Oct. 2009, pp. 401-405.

Jaehoon Roh, et al., "Femtocell Traffic Offload Scheme for Core Networks", IEEE IFIP International Conference on New Technologies, Mobility and Security (NTMS), Feb. 2011, pp. 1-5.

Tarik Taleb, et al., "DNS-based Solution for Operator Control of Selected IP Traffic Offload", IEEE International Conference on Communications (ICC), Jun. 2011, pp. 1-5.

* cited by examiner

METHOD AND SYSTEM FOR DATA TRAFFIC OFFLOAD

CROSS-REFERENCE TO RELATED APPLICATION

This application claims the priority benefit of Taiwan application serial no. 101146418, filed on Dec. 10, 2012. The entirety of the above-mentioned patent application is hereby incorporated by reference herein and made a part of this specification.

TECHNICAL FIELD

The disclosure relates to a method and a system for data traffic offload.

BACKGROUND

Data traffic in mobile telecommunication networks has been rapidly growing in recent years. Radio resource insufficiency is not only a problem on a front end but also on a back-end core network. On the traditional 3G telecommunication network, all data traffic enters the core network and increases the loading thereon.

Hence, traffic offload is an issue that the current mobile telecommunication network operators are facing to. The so-called traffic offload refers to routing data locally as possible to prevent the data from transmitting to the core network, and thus the loading on the core network may be reduced.

There exist two conventional solutions for resources insufficiency on mobile telecommunication systems due to a significant increment on data traffic. The first solution to solve the radio resource insufficiency is to establish small cell networks with low power so as to enhance a re-use rate of spectrum and data traffic offloading ability on a unit area. The second solution to solve resource insufficiency on the back-end core network is a local Internet protocol access (LIPA) plan and a selected Internet protocol traffic offload (SIPTO) plan set by the $3^{rd}$ generation partnership project (3GPP) for Intranet and Internet respectively.

No matter whether the future mobile telecommunication network adapts a new generation of the long term evolution (LTE) technology or the LTE-Advanced technology, the system architectures thereof both use Internet protocols to be their transmission standard.

Peer-to-peer transmission such as speech or video transmission, a shared white board, file transfer, and instant messaging is a commonly used service type in telecommunication. Data traffic of peer-to-peer service transmission is quite large and is considered as a significant loading with respect to the core network. Therefore, if the data traffic of peer-to-peer services is able to be offloaded, not only the loading of the core network may be reduced, but also user satisfaction of the mobile network user may be enhanced. However, 3GPP has not yet provided any solution specific to peer-to-peer data traffic.

SUMMARY

A method and a system for data traffic offload are provided in the present disclosure, and may provide a solution for data traffic offload. The system and the method for data traffic offload may route data packets on a front end, and may reduce data traffic on a core network.

A method for data traffic offload is provided in the present disclosure. The method includes the following steps. Create a local tunnel between a first base station and a second base station according to a first record and/or a second record. The first base station and the second base station are located on a front-end network. The first record corresponds to a first user equipment and the first base station. The second record corresponds to a second user equipment and the second base station. Route network packets transmitted from the first user equipment to the second user equipment and/or network packets transmitted from the second user equipment to the first user equipment via the local tunnel.

A system for data traffic offload is provided in the present disclosure. The system includes a database, a first base station, and a second base station. The first base station and the second base station are coupled to the database. The first base station and the second base station are located on a front-end network. The first base station and the second base station create a local tunnel between the first base station and the second base station and route network packets from the first user equipment to the second user equipment and/or network packets from the second user equipment to the first user equipment via the local tunnel. The first record corresponds to the first user equipment and the first base station. The second record corresponds to the second user equipment and the second base station.

Another method for data traffic offload suitable for a base station is provided in the present disclosure. The method includes the following steps. Receive a network packet from a first user equipment, wherein a destination of the network packet is a second user equipment. Search for a record according to a network address of the second user equipment. Create a local tunnel on a front-end network according to the record. Route network packets from the first user equipment to the second user equipment and/or network packets from the second user equipment to the first user equipment according to the record via the local tunnel.

Another method for data traffic offload suitable for a base station is provided in the present disclosure. The method includes the following steps. Receive a network packet from the mobile telecommunication network, wherein the network packet comes from a first user equipment and a destination of the network packet is a second user equipment. Search for a record according to a network address of the first user equipment. Create a local tunnel on a front-end network. Route network packets from the first user equipment to the second user equipment and/or the second user equipment to the first user equipment via the local tunnel.

The accompanying drawings are included to provide further understanding, and are incorporated in and constitute a part of this specification. The drawings illustrate exemplary embodiments and, together with the description, serve to explain the principles of the present disclosure.

BRIEF DESCRIPTION OF THE DRAWINGS

FIG. 2 to FIG. 5C are flowcharts of a method for data traffic offload according to an embodiment of the present disclosure.

DETAILED DESCRIPTION OF DISCLOSED EMBODIMENTS

Figure 1:
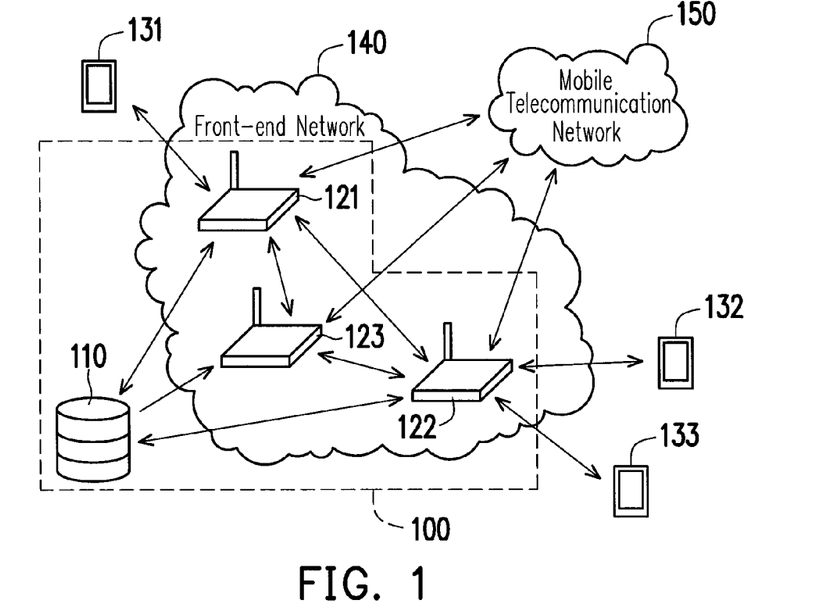
FIG. 1 is a schematic diagram of a system for data traffic offload according to an embodiment of the present disclosure.

FIG. 1 is a schematic diagram of a system for data traffic offload 100 according to an embodiment of the present disclosure. The system for data traffic offload 100 includes a database 110 and base stations 121-123. Each of the base stations 121-123 may be a Node B, Home Node B (HNB), E-UTRAN Node B (eNB), or Home E-UTRAN Node B (HeNB). The base stations 121-123 are all located on a frontend network 140. The front-end network 140 is a network that connects each base station on a front end so that the base stations 121-123 are coupled to each other via the front-end network 140. Each of the base stations 121-123 is coupled to the database 110 and a mobile telecommunication network 150 as well, wherein the base stations 121-123 are base stations of the mobile telecommunication network 150. The base station 121 is a service base station of a user equipment 131, and the second base station 122 is a service base station of user equipments 132 and 133. All of the base stations 121-123, the user equipment 131-133, the front-end network 140, and the mobile telecommunication network 150 conform to the 3GPP standard.

The front-end network 140 uses Internet protocols (IP). For example, the front-end network 140 may be an Internet, an Intranet, or a local area network (LAN). The database 110 may be a server on the front-end network 140 or the mobile telecommunication network 150. With respect to the front-end network 140, the mobile telecommunication network 150 may be referred as a core network. Only the three base stations and the three user equipments are illustrated in the present embodiment, and yet the present disclosure is neither limited to the number of base stations in the system for data traffic offload nor the number of user equipments served by base stations.

Figure 2:
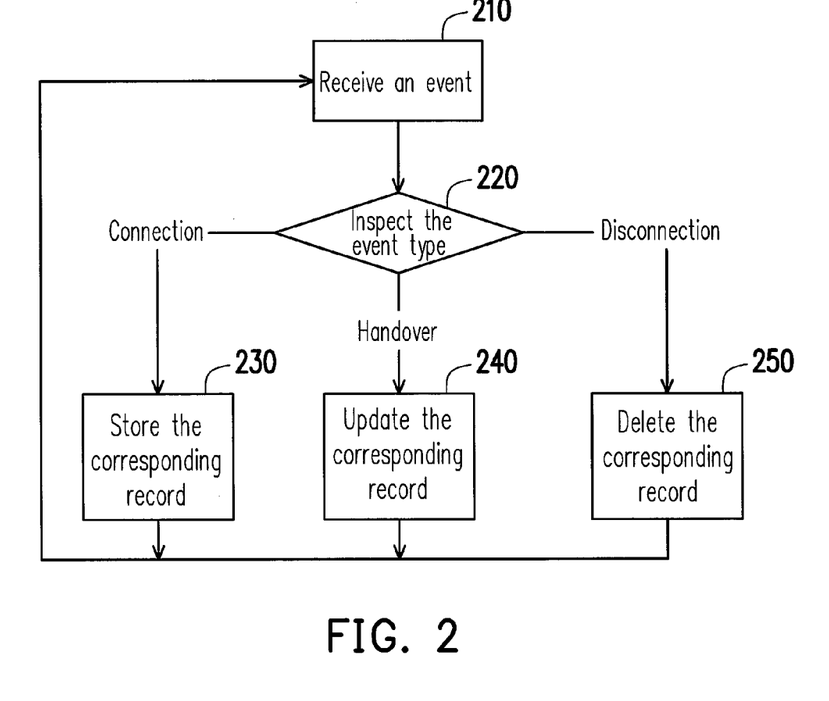

FIG. 2 is a flowchart of a method for data traffic offload according to an embodiment of the present disclosure. The method is related to the management of the database 110. The database 110 is used for storing records corresponding to each station and each user equipment. The method in FIG. 2 is executed by one or a plurality of base stations of the system for data traffic offload 100. First, a control plane event is received in step 210. An event type is inspected in step 220.

When the event type is that a user equipment establishes connection to the mobile telecommunication network 150 via a base station, the base station stores a record corresponding to the user equipment and the base station in the database 110 in step 230. The record includes an identification code and a network address of the user equipment as well as a network address of the base station. For example, when the user equipment 131 establishes a connection to the mobile telecommunication network 150 via the base station 121, the base station 121 stores a record in the database 110, wherein the record includes an identification code and a network address of the user equipment 131 as well as a network address of the base station 121. When the user equipment 133 establishes connection to the mobile telecommunication network 150 via the base station 122, the base station 122 stores a record in the database 110. The record includes an identification code and a network address of the user equipment 133 as well as a network address of the base station 122. The user equipments in the present embodiment may use an International Mobile Subscriber Identity (IMSI) or other codes which are able to distinguish from user identities to be the aforementioned identification code. The user equipments and the base stations use IP addresses to be the aforementioned network address.

When the event type is a handover procedure initiated by a user equipment moved from a service range of a first base station to that of a second base station, the second base station updates a record corresponding to the user equipment to be corresponding to the user equipment and the second base station in step 240. The aforementioned handover may be an X2 handover or a S1 handover. For example, if the user equipment 131 moves from a service range of the base station 121 to that of the base station 122, the record originally corresponding to the user equipment 131 including the identification code and the network address of the user equipment 131 as well as the network address of the base station 121 is updated by the base station 122 to be a record including the identification code and the network address of the user equipment 131 as well as the network address of the base station 122 in step 240.

When the event type is that a user equipment disconnects from the mobile telecommunication network 150, a service base station of the user equipment deletes a record corresponding to the user equipment from the database 110 in step 250.

Figure 3A:
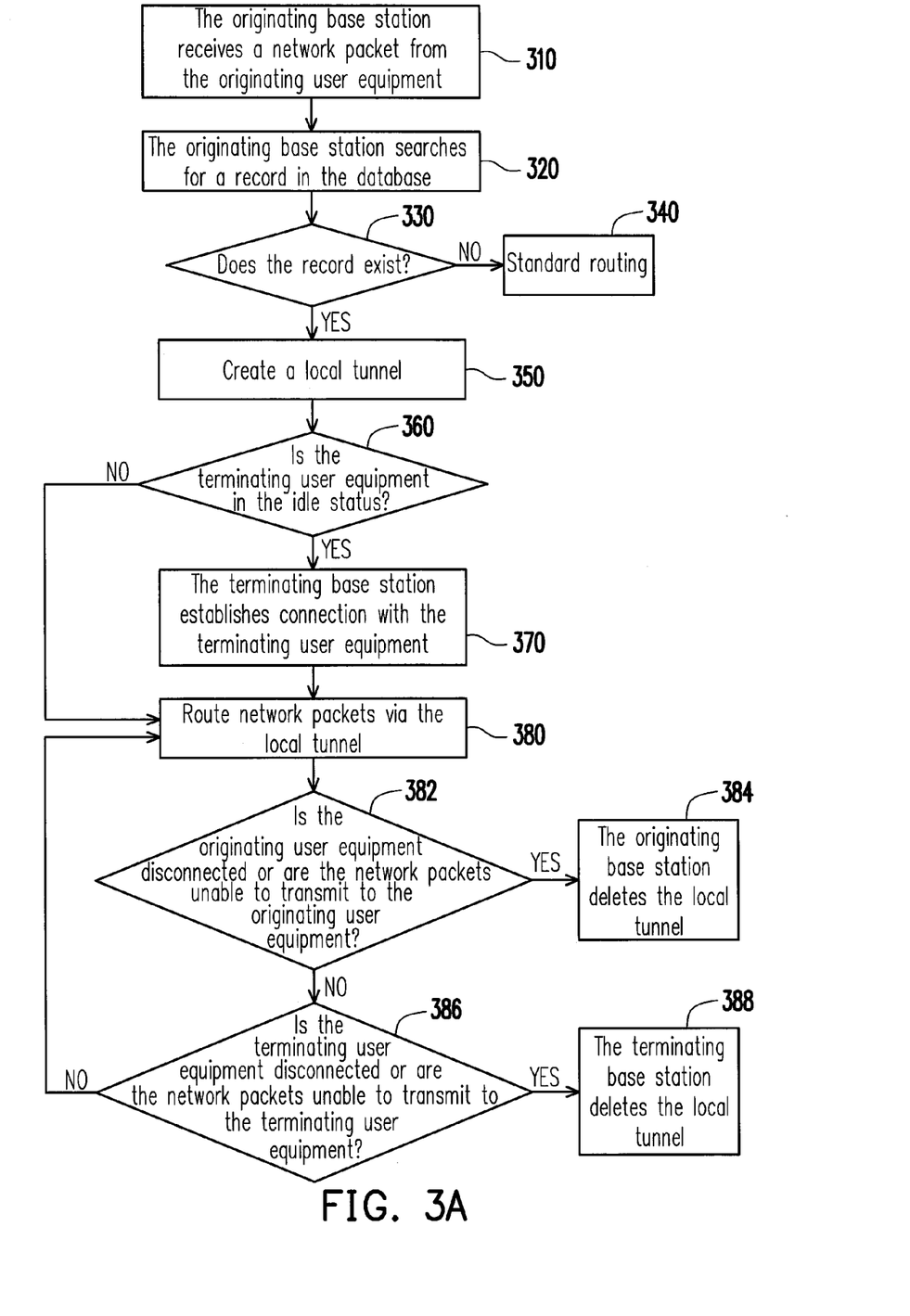
Figure 3B:
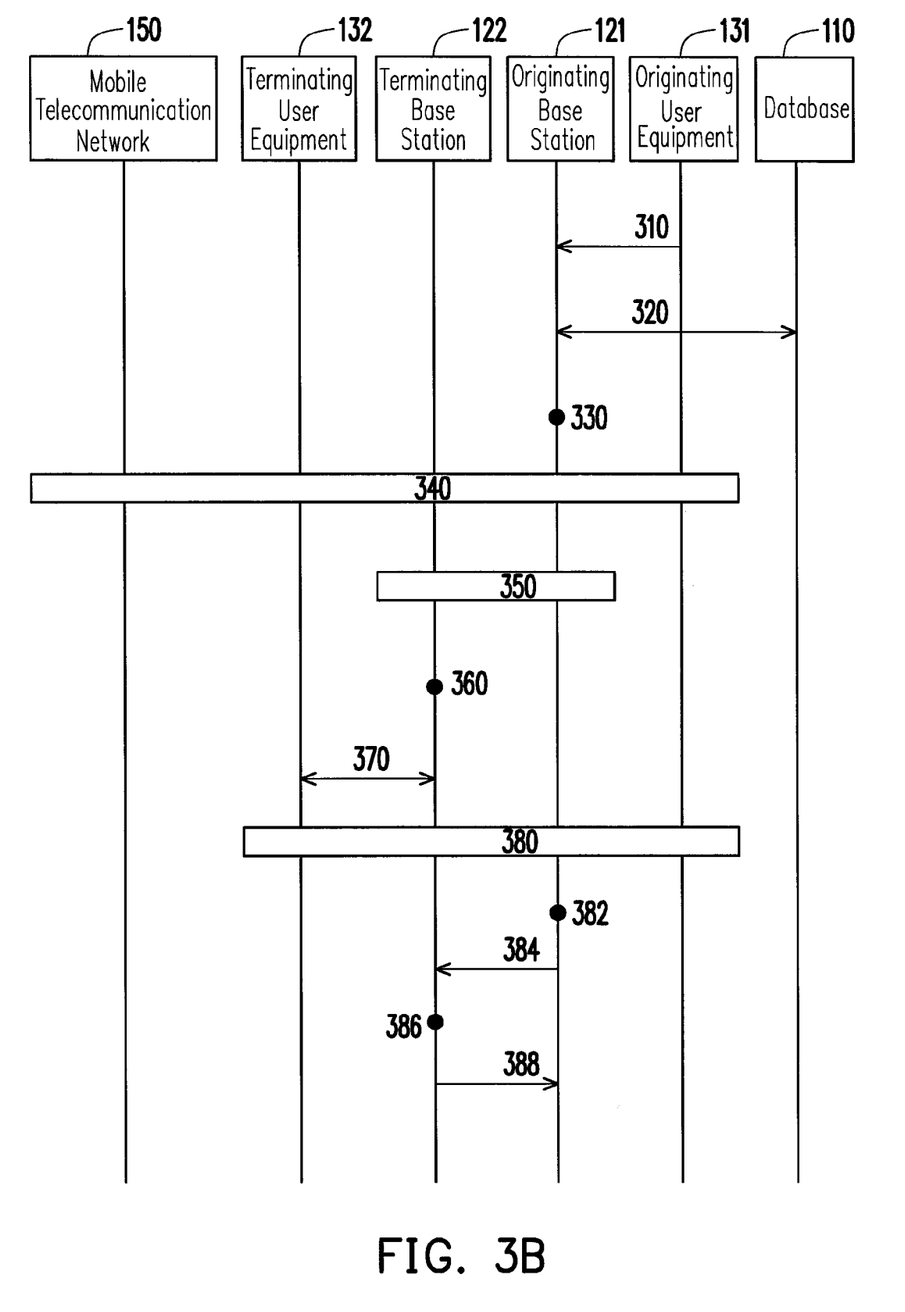

FIG. 3A is a flowchart of a method for data traffic offload according to an embodiment of the present disclosure. FIG. 3B illustrates executing devices and receiving devices of each of the steps in FIG. 3A. The method in FIG. 3A and FIG. 3B is related to offloading data traffic passing through a core network between user equipments on a front end, and such method may be executed by the system for data traffic offload 100. The following descriptions will use a network packet transmission between the user equipments 131 and 132 as an example. First, the user equipment 131 sends a first network packet to the user equipment 132. Thus, the user equipment 131 and the base station 121 are referred as an originating user equipment and an originating base station respectively, while the user equipment 132 and the base station 122 are referred as a terminating user equipment and a terminating base station respectively.

In step 310, the originating base station 121 receives the first network packet from the originating user equipment 131. A destination of such network packet is the terminating user equipment 132, and therefore a destination address of the network packet is a network address of the terminating user equipment 132. In step 320, the originating base station 121 searches for a record corresponding to the terminating user equipment 132 from the database 110 according to the network address of the terminating user equipment 132. In step 330, the originating base station 121 checks if the record corresponding to the terminating user equipment 132 exists in the database 110. If such record does not exist, the originating base station 121 transmits the network packet by a routing method in the 3G network standard in step 340.

If the record corresponding to the terminating user equipment 132 does exist in the database 110, the originating base station 121 may obtain the network address of the terminating base station 122 from the record so as to communicate with the terminating base station 122. In step 350, both the base stations 121 and 122 create a local tunnel therebetween on the front-end network 140 based on the network addresses of each other. In the present embodiment, a procedure of creating the local tunnel is initiated by the originating base station 121.

Next, in step 360, the terminating base station 122 checks if the terminating user equipment 132 is in an idle status. When the terminating user equipment 132 is not in the idle status, it represents that an existing connection may be used between the terminating user equipment 132 and the terminating base station 122 and the flow may proceed to step 380. When the terminating user equipment 132 is in the idle status, in step 370, the terminating base station 122 pages the terminating equipment 132 and establishes connection between the terminating base station 122 and the terminating user equipment 132. Then, in step 380, both the base stations 121 and 122 route network packets from the user equipment 132 to the user equipment 131, network packets from the user equipment 131 to the user equipment 132, or network packets transmitted between the user equipments 131 and 132 via the aforementioned local tunnel.

The aforementioned local tunnel refers to that headers originally used for routing the network packets between the user equipments 131 and 132 may be changed by the base stations 121 and 122, and destination addresses of the network packets are accordingly changed so that the network packets may be directly sent to the base stations 121 and 122 via the front-end network 140 instead of the mobile telecommunication network 150. Therefore the local tunnel may offload data traffic on the core network 150.

Next, in step 382, the originating base station 121 checks if the originating user equipment 131 disconnects from the mobile telecommunication network 150 or if the network packets are unable to transmit to the originating user equipment 131 due to certain problems. If any of the situations occurs during the checking in step 382, the originating base station 121 deletes the local tunnel in step 384. After the local tunnel is deleted, if the originating user equipment 131 still needs to send packets, the method flow in FIG. 3A and FIG. 3B may be re-executed from step 310.

If none of the situations occurs during the checking in step 382, the terminating base station 122 checks if the terminating user equipment 132 disconnects from the mobile telecommunication network 150 or if the network packets are unable to transmit to the terminating user equipment 132 due to certain problems in step 386. If any of the situations occurs during the checking in step 386, the terminating base station 122 deletes the local tunnel in step 388. After the local tunnel is deleted, if the originating user equipment 131 still needs to send packets, the method flow in FIG. 3A and FIG. 3B may be re-executed from step 310. If none of the situations occurs during the checking in step 386, the flow returns to step 380.

The 3GPP standard protocol or a customized protocol may be adapted in each of the steps hereinbefore. For example, if the standard protocol is adapted, a General Packet Radio Service Tunnelling Protocol (abbreviated as GPRS Tunnelling Protocol or GTP) may be used in step 350; an existing paging mechanism in the 3GPP standard may be used in step 370.

Figure 4A:
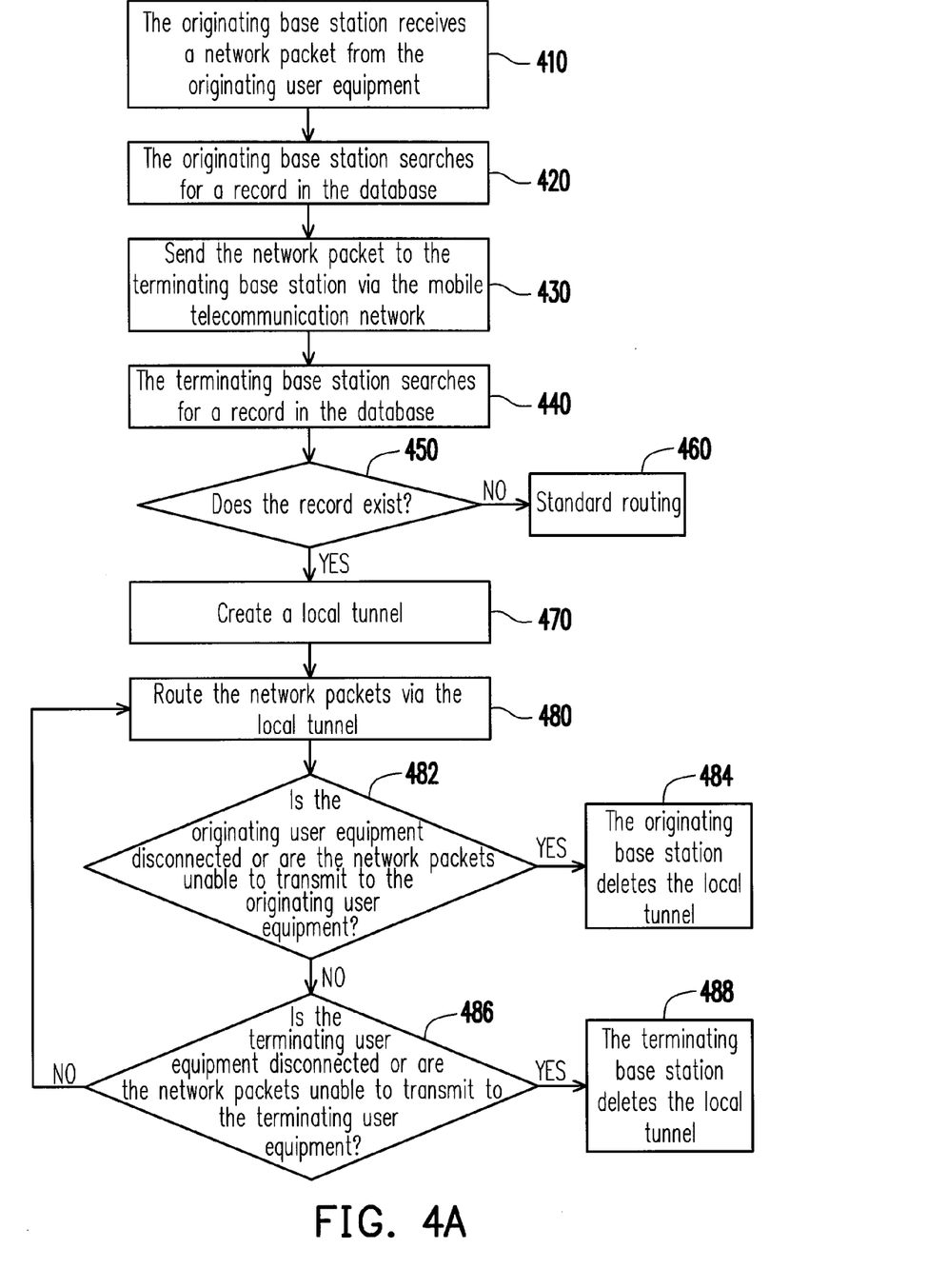
Figure 4B:
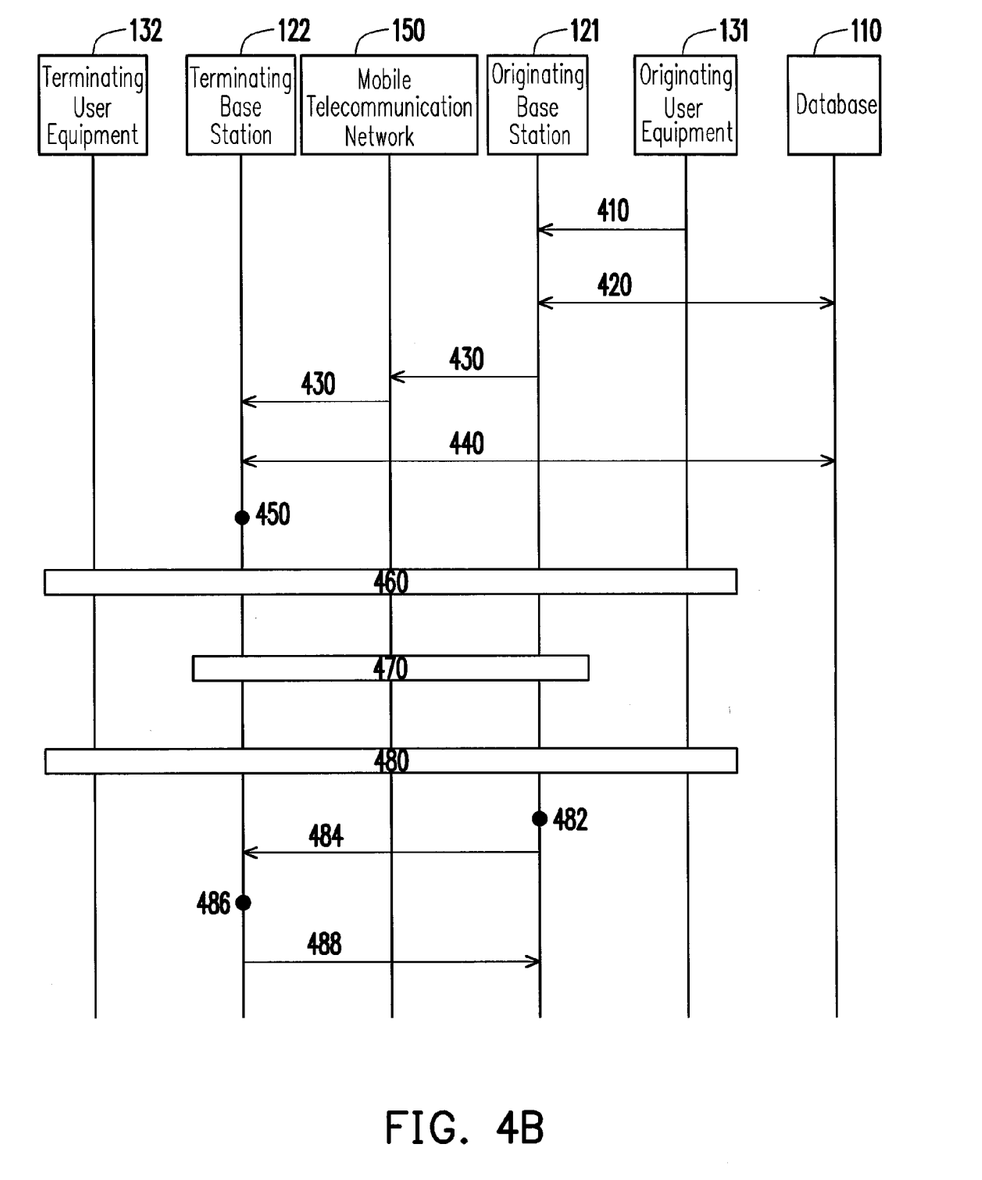

FIG. 4A is a flowchart of a method for data traffic offload according to an embodiment of the present disclosure. FIG. 4B illustrates executing devices and receiving devices of each of the steps in FIG. 4A. The method in FIG. 4A and FIG. 4B is also related to offloading peer-to-peer data traffic on a front-end core network, and such method may be executed by the system for data traffic offload 100. The following descriptions will also use a network packet transmission between the user equipments 131 and 132 as an example.

First, in step 410, the originating base station 121 receives a first network packet from the originating user equipment 131. A destination of the network packet is the terminating user equipment 132, and therefore a destination address of the network packet is the network address of the terminating user equipment 132. In step 420, the originating base station 121 searches for a record corresponding to the terminating user equipment 132 from the database 110 according to the network address of the terminating user equipment 132. The record includes the network addresses of the terminating user equipment 132 and the terminating base station 122. According to the searched result, the originating base station 121 waits for a connection establishment request initiated by the terminating base station 122. Then, the originating base station 121 may send the first network packet to the terminating base station 122 via the mobile telecommunication network 150 by a conventional method in step 430. If the terminating user equipment 132 is in the idle status, the mobile telecommunication may page the terminating user equipment 132.

After receiving the first network packet, in step 440, the terminating base station 122 may search for a record corresponding to the originating user equipment 131 from the database 110 according to the originating user equipment 131. In step 450, the terminating base station 122 checks if the record corresponding to the originating user equipment 131 exists in the database 110. If the record does not exist, the originating base station 121 sends the following network packets by a routing method in the 3G network standard in step 460.

If the record corresponding to the originating user equipment 131 does exist in the database 110, the terminating base station 122 may obtain the network address of the originating base station 121 from the record so as to communicate with the originating base station 121. In step 470, both the base stations 121 and 122 create a local tunnel between the base stations 121 and 122 on the front-end network 140 based on the network addresses of each other. In the present embodiment, a procedure of creating the local tunnel is initiated by the terminating base station 122. Then, in step 480, both the base stations 121 and 122 route the network packets between both user equipments 131 and 132 via the local tunnel. Steps 482-488 are the same as steps 382-388 in FIG. 3 and will not be repeated herein.

A difference between the present embodiment and the previous embodiment is that the routing methods of the first packet are different and the creation of the local tunnel is initiated from different base stations. Moreover, if the terminating user equipment 132 is in the idle status, the terminating user equipment 132 may be paged via the mobile telecommunication network 150 in the present embodiment while the terminating user equipment 132 requires to be paged by the terminating base station 122.

Figure 5A:
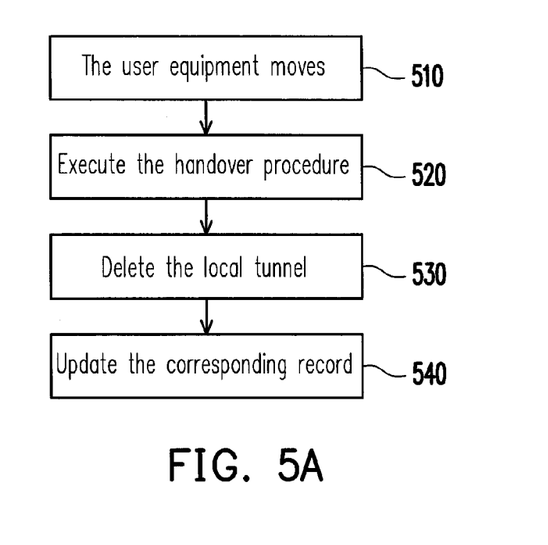
Figure 5B:
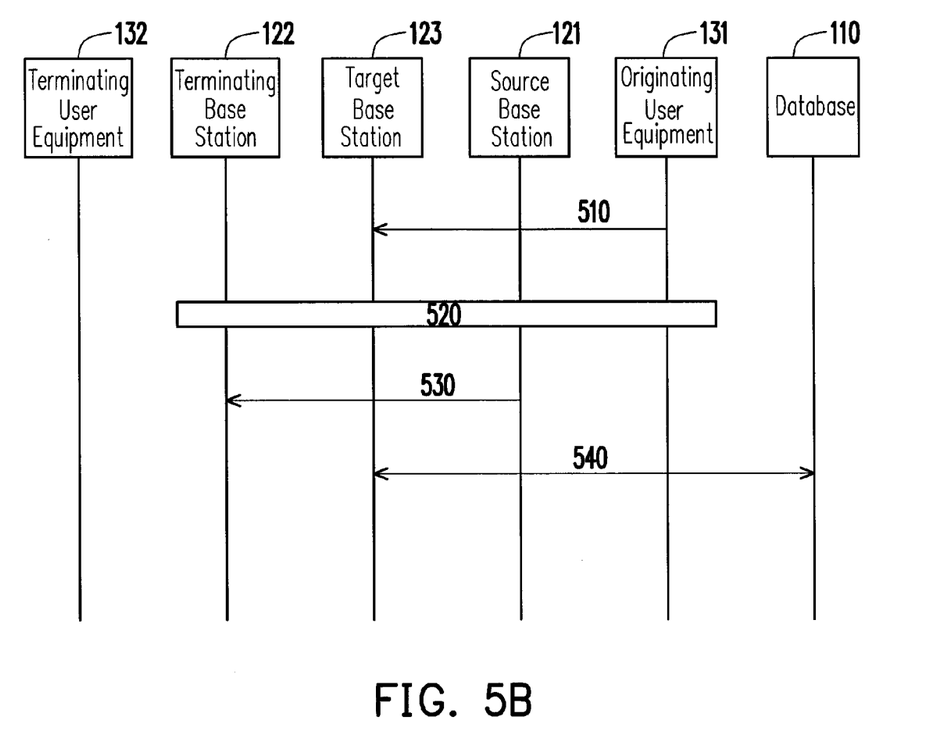

FIG. 5A is a flowchart of a method for data traffic offload according to an embodiment of the present disclosure. FIG. 5B illustrates executing devices and receiving devices of each of the steps in FIG. 5A. When the originating user equipment 131 moves to a service range of another base station during packet transmission process, the method in FIG. 5A and FIG. 5B is a processing flow of data transmission taken over by the another base station, and such method may be executed by the system for data traffic offload 100.

The method flow in FIG. 5A and FIG. 5B may go with steps 310-380 in FIG. 3A and FIG. 3B and continues after step 380, and it may also go with steps 410-480 in FIG. 4A and FIG. 4B and continues after step 480. When the originating user equipment 131 moves from the service range of the base station 121 to that of the base station 123 and changes to be served by the base station 123, the flow enters step 510. Therefore, the base station 121 is called a source base station, and the base station 123 is called a target base station in FIG. 5B. Then, in step 520, the base stations 121-123 execute the corresponding handover procedure. In step 530, the source base station 121 deletes the local tunnel created in step 350. In step 540, the target base station 123 updates the record corresponding to the originating user equipment 131 stored in the database 110 to be corresponding to the user equipment 131 and the target base station 123. Before step 540, the record includes the identification code and the network address of the originating user equipment 131 as well as the network address of the source base station 121. After step 540, the record includes the identification code and the network address of the originating user equipment 131 as well as the network address of the target base station 123.

After step 540, if the originating user equipment 131 still needs to send network packets to the terminating user equipment 132, the flow goes back to step 310 in FIG. 3A and FIG. 3B or step 410 in FIG. 4A and FIG. 4B. However, the current originating base station has been changed to the target base station 123, and the terminating base station 122 remains unchanged.

Figure 5C:
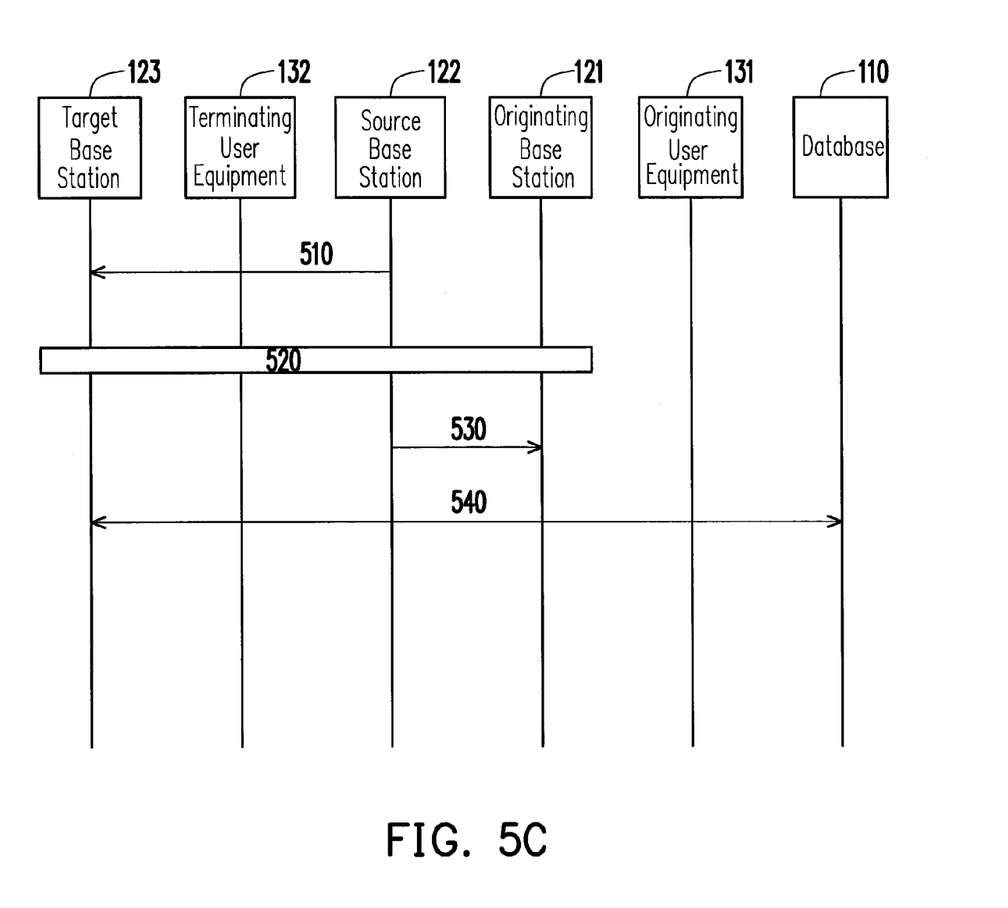

FIG. 5A may also go with FIG. 5C, in which the terminating user equipment 132 moves to another base station during packet transmission process, and the data transmission process is taken over by the another base station. Such method may be executed by the base stations of the system for data traffic offload 100. FIG. 5C illustrates executing devices and receiving devices of each step in FIG. 5A.

The method flow in FIG. 5A and FIG. 5C may go with step 310-380 in FIG. 3A and FIG. 3B and continues after step 380, and it may also go with step 410-480 FIG. 4A and FIG. 4B and continues after step 480. When the terminating user equipment 132 moves from the service range of the base station 122 to that of the base station 123 and changes to be served by the base station 123, the flow goes to step 510. Therefore, the base station 122 is called the source base station, and the base station 123 is called the target base station in FIG. 5C. Next, the base stations 121-123 execute the corresponding handover procedure in step 520. In step 530, the source base station 122 deletes the local tunnel created in step 350. In step 540, the target base station 123 updates the record corresponding to the terminating user equipment 132 stored in the database 110 to be corresponding to the terminating user equipment 132 and the target base station 123. Before step 540, the record includes the identification code and the network address of the terminating user equipment 132 as well as the network address of the source base station 122. After step 540, the record includes the identification code and the network address of the terminating user equipment 132 as well as the network address of the target base station 123.

After step 540, if the originating user equipment 131 needs to send network packets to the terminating user equipment 132, the flow goes back to step 310 in FIG. 3A and FIG. 3B or step 410 in FIG. 4A and FIG. 4B. However, the current originating base station 121 remains unchanged, and the terminating base station has been changed to the target base station 123.

In the embodiments hereinbefore, a plurality of base stations serve different roles such as an originating base station, a terminating base station, a source base station, and a target base station. In fact, each of the base stations in the embodiment hereinbefore includes the same functions, and therefore the aforementioned base stations may exchange their roles. Additionally, each of the base stations hereinbefore may be replaced by access points.

Figure 6:
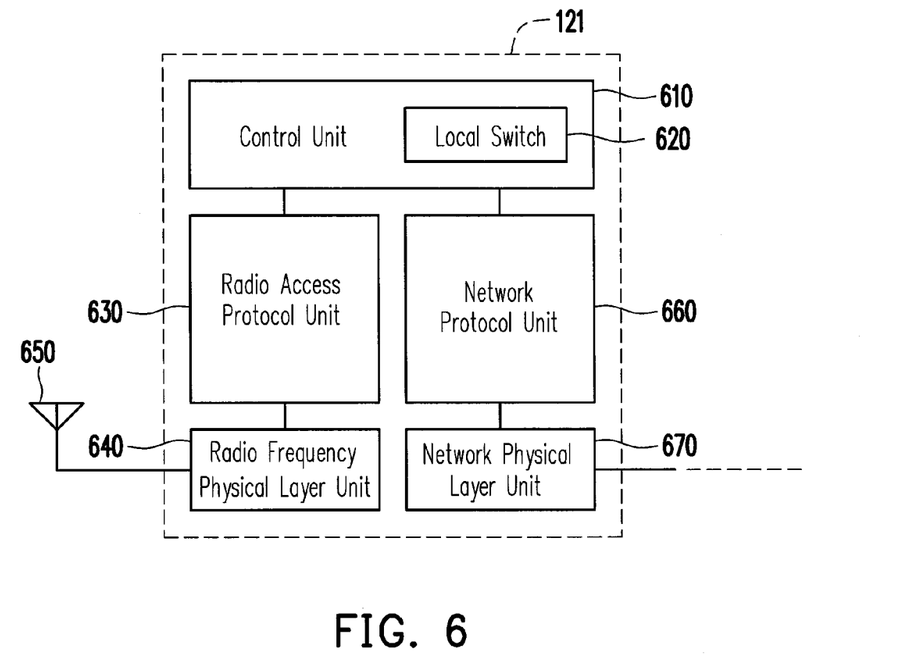
FIG. 6 is a schematic diagram of a base station of the system for data traffic offload according to an embodiment of the present disclosure.

FIG. 6 is a schematic diagram of a base station of the system for data traffic offload 100 according to an embodiment of the present disclosure. In the present embodiment, each base station of the system for data traffic offload 100 is the same. The following descriptions will use the base station 121 as an example.

The base station includes a control unit 610, a local switch 620, a radio access protocol unit 630, a radio frequency physical layer unit 640, an antenna 650, a network protocol unit 660, and a network physical layer unit 670. The radio frequency physical layer unit 640 is coupled with the antenna 650; the radio access protocol unit 630 is coupled with the radio frequency physical layer unit 640; the network physical layer unit 670 is coupled with the front-end network 140; the network protocol unit 660 is coupled with the network physical layer unit 670; the control unit 610 is coupled with the radio access protocol unit 630 and the network protocol unit 660; the local switch 620 is a module attached to the control unit 610. All of the control unit 610, the local switch 620, the radio access protocol unit 630, the radio frequency physical layer unit 640, the network protocol unit 660, and the network physical layer unit 670 may be hardware circuits or software modules.

The antenna 650 is used for transmitting radio signals to the user equipments in each of the embodiments hereinbefore and receiving radio signals transmitted by the user equipments in each of the embodiment hereinbefore. The radio frequency physical layer unit 640 processes radio signals from the antenna 650 or to be sent to the antenna 650 in a physical layer. The radio access protocol unit 630 executes radio communication protocol conforming to the 3GPP standard. The network physical layer unit 670 processes network signals from the front-end network 140 or the mobile telecommunication network 150 as well as network signals to be transmitted to the front-end network 140 or the mobile telecommunication network 150 in the physical layer. The network protocol unit 660 executes network communication protocols of the front-end network 140 such as Internet protocols.

The control unit 610 and the local switch 620 execute the flow methods in FIG. 2 to FIG. 5C. The control unit 610 is a main controller or a main control system of the base station 121. The local switch 620 executes steps 230-250, 320, 370, 420, 440, and 540, while the rest of steps are executed by the control unit 610. The local switch 620 in the present embodiment is a module attached to the control unit 610, and yet in other embodiments in the present disclosure, the local switch 620 may also be an independent module not attached to the control unit 610.

To sum up, the method and the system for data traffic offload in the embodiment hereinbefore may offload peer-to-peer data traffic on a front-end network so as to reduce loadings on a core network. The method and the system for data traffic offload in the embodiment hereinbefore are not required to make any changes on components of user equipments and the core network, and small cell base stations or access points on the front end may be required to make changes. The method and the system for data traffic offload in the embodiment hereinbefore may use an existing session management mechanism in the 3GPP standard without setting up a session management procedure additionally for peer-to-peer data traffic.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for data traffic offload, comprising:
creating a local tunnel between a first base station and a second base station according to a first record and/or a second record, wherein the first base station and the second base station are located on a front-end network, and wherein the first record comprises an identification code and a network address of a first user equipment as well as a network address of the first base station, and wherein the second record comprises an identification code and a network address of a second user equipment as well as a network address of the second base station; and routing network packets transmitted from the first user equipment to the second user equipment and/or network packets transmitted from the second user equipment to the first user equipment via the local tunnel, wherein the local tunnel refers to headers originally used for routing the network packets between the first user equipment and the second user equipment that is configured to be changed by the first base station and the second base station.

2. The method for data traffic offload of claim 1, further comprising:
   establishing connection from the first user equipment to a mobile telecommunication network via the first base station;
   storing the first record;
   establishing connection from the second user equipment to the mobile telecommunication network via the second base station; and
   storing the second record.

3. The method for data traffic offload of claim 2, wherein the first record and the second record are stored in a database, and wherein the database is located on the front-end network or on the mobile telecommunication network.

4. The method for data traffic offload of claim 2, further comprising:
   deleting the first record due to disconnection of the first user equipment from the mobile telecommunication network.

5. The method for data traffic offload in claim 2, further comprising:
   deleting the second record due to disconnection of the second user equipment from the mobile telecommunication network.

6. The method for data traffic offload of claim 1, wherein the step of creating the local tunnel comprises:
   receiving a network packet from the first user equipment, wherein a destination of the network packet is the second user equipment;
   searching for the second record according to the network address of the second user equipment; and
   creating the local tunnel according to the network address of the first base station and the network address of the second base station.

7. The method for data traffic offload of claim 1, further comprising:
   paging the second user equipment; and
   establishing connection between the second base station and the second user equipment.

8. The method for data traffic offload of claim 1, wherein the step of creating the local tunnel comprises:
   receiving a network packet from the first user equipment, wherein a destination of the network packet is the second user equipment;
   sending the network packet to the second base station via a mobile telecommunication network;
   searching for the first record according to the network address of the first user equipment; and
   creating the local tunnel according to the network address of the first base station and the network address of the second base station.

9. The method for data traffic offload of claim 1, further comprising:
   when the first user equipment moves to a service range of a third base station and changes to be served by the third base station, updating the first record to be corresponding to the first user equipment and the third base station, wherein the third base station is located on the front-end network.

10. The method for data traffic offload of claim 9, further comprising:
    after the first record is updated, creating another local tunnel between the second base station and the third base station according to the first record and/or the second record, and routing the network packets from the first user equipment to the second user equipment and/or the network packets from the second user equipment to the first user equipment via the another local tunnel.

11. The method for data traffic offload of claim 1, further comprising:
    when the second user equipment moves to a service range of a third base station and changes to be served by the third base station, updating the second record to be corresponding to the second user equipment and the third base station, wherein the third base station is located on the front-end network.

12. The method for data traffic offload in claim 11, further comprising:
    after the second record is updated, creating another local tunnel between the first base station and the third base station according to the first record and/or the second record, and routing the network packets from the first user equipment to the second user equipment and/or the network packets from the second user equipment to the first user equipment via the another local tunnel.

13. The method for data traffic offload of claim 1, further comprising:
    executing a corresponding handover procedure and deleting the local tunnel due to the first user equipment and/or the second user equipment moving to a service range of a third base station, wherein the third base station is located on the front-end network.

14. The method for data traffic offload of claim 1, further comprising:
    deleting the local tunnel due to at least one of the followings: disconnection of the first user equipment from a mobile telecommunication network, network packets unable to transmit to the first user equipment, disconnection of the second user equipment from the mobile telecommunication network, and network packets unable to transmit to the second user equipment.

15. A system for data traffic offload, comprising:
    a database;
    a first base station coupled to the database; and
    a second base station coupled to the database, wherein the first base station and the second base station are located on a front-end network, and wherein the first base station and the second base station create a local tunnel between the first base station and the second base station according to a first record and/or a second record and route network packets from a first user equipment to a second user equipment and/or network packets from the second user equipment to the first user equipment via the local tunnel, and wherein the first record comprises an identification code and a network address of the first user equipment as well as a network address of the first base station, and wherein the second record comprises an identification code and a network address of the second user equipment as well as a network address of the second base station, wherein the local tunnel refers to headers originally used for routing the network packets between the first user equipment and the second user equipment that is configured to be changed by the first base station and the second base station.

16. The system for data traffic offload of claim 15, wherein the first user equipment establishes connection to a mobile telecommunication network via the first base station, wherein the first base station stores the first record in the database, and wherein the second user equipment establishes connection to the mobile telecommunication network via the second base station, and wherein the second base station stores the second record in the database.

17. The system for data traffic offload of claim 16, wherein the database is located on the front-end network or the mobile telecommunication network.

18. The system for data traffic offload of claim 16, wherein the first base station deletes the first record from the database due to disconnection of the first user equipment from the mobile telecommunication network.

19. The system for data traffic offload of claim 16, wherein the second base station deletes the second record from the database due to disconnection of the second user equipment from the mobile telecommunication network.

20. The system for data traffic offload of claim 15, wherein the first base station receives a network packet from the first user equipment, searches for the second record according to the network address of the second user equipment, and creates the local tunnel according to the network address of the first base station and the network address of the second base station, wherein a destination of the network packet is the second user equipment.

21. The system for data traffic offload of claim 15, wherein the second base station pages the second user equipment and establishes connection between the second base station and the second user equipment.

22. The system for data traffic offload of claim 15, wherein the first base station receives a network packet from the first user equipment and sends the network packet to the second base station via a mobile telecommunication network, and wherein a destination of the network packet is the second user equipment; wherein the second base station searches for the first record according to the network address of the first user equipment and creates the local tunnel according to the network address of the first base station and the network address of the second base station.

23. The system for data traffic offload of claim 15, further comprising:
a third base station coupled to the database and located on the front-end network, wherein the first user equipment moves to a service range of the third base station and changes to be served by the third base station, the third base station updates the first record to be corresponding to the first user equipment and the third base station.

24. The system for data traffic offload of claim 23, wherein after the third base station updates the first record, the second base station and/or the third base station create another local tunnel between the second base station and the third base station according to the first record and/or the second record and route the network packets from the first user equipment to the second user equipment and/or the network packets from the second user equipment to the first user equipment via the another local tunnel.

25. The system for data traffic offload of claim 15, further comprising:
a third base station coupled to the database and located on the front-end network, wherein the second user equipment moves to a service range of the third base station and changes to be served by the third base station, the third base station updates the second record to be corresponding to the second user equipment and the third base station.

26. The system for data traffic offload of claim 25, wherein after the third base station updates the second record, the first base station and/or the third base station create another local tunnel between the first base station and the third base station according to the first record and/or the second record and route the network packets from the first user equipment to the second user equipment and/or the network packets from the second user equipment to the first user equipment via the another local tunnel.

27. The system for data traffic offload of claim 15, wherein due to the first user equipment and/or the second user equipment moving to a service range of a third base station, the first base station, the second base station, and the third base station execute a corresponding handover procedure, and the first base station or the second base station deletes the local tunnel, wherein the third base station is located on the front-end network.

28. The system for data traffic offload of claim 15, wherein the first base station or the second base station deletes the local tunnel due to at least one of the followings: disconnection of the first user equipment from a mobile telecommunication network, network packets unable to transmit to the first user equipment, disconnection of the second user equipment from the mobile telecommunication network, and network packets unable to transmit to the second user equipment.

29. A method for data traffic offload, suitable for a first base station, comprising:
receiving a network packet from a first user equipment, wherein a destination of the network packet is a second user equipment;
searching for a record according to a network address of the second user equipment, wherein the record comprises an identification code and the network address of the second user equipment as well as a network address of a second base station;
creating a local tunnel on a front-end network according to the record; and
routing network packets from the first user equipment to the second user equipment and/or network packets from the second user equipment to the first user equipment via the local tunnel, wherein the local tunnel refers to headers originally used for routing the network packets between the first user equipment and the second user equipment that is configured to be changed by the first base station and a second base station.

30. The method for data traffic offload of claim 29, wherein the first base station and the second base station are located on the front-end network, and wherein the second user equipment establishes connection to a mobile telecommunication network via the second base station.

31. The method for data traffic offload of claim 30, wherein the record is stored in a database, and wherein the database is located on the front-end network or the mobile telecommunication network.

32. The method for data traffic offload of claim 30, wherein the step of creating the local tunnel comprises:
creating the local tunnel according to a network address of the first base station and the network address of the second base station.

33. The method for data traffic offload of claim 30, further comprising:

deleting the local tunnel due to disconnection of the first user equipment from the mobile telecommunication network and/or network packets unable to transmit to the first user equipment.

34. The method for data traffic offload of claim 29, further comprising:

executing a corresponding handover procedure and deleting the local tunnel due to the first user equipment moving to a service range of a third base station and changing to be served by the third base station, wherein the third base station is located on the front-end network.

35. A method for data traffic offload, suitable for a first base station, comprising:

receiving a network packet from a mobile telecommunication network, wherein the network packet is from a first user equipment, and wherein a destination of the network packet is a second user equipment;

searching for a record according to a network address of the first user equipment, wherein the record comprises an identification code and the network address of the first user equipment as well as a network address of a second base station;

creating a local tunnel on a front-end network according to the record; and routing network packets from the first user equipment to the second user equipment and/or network packets from the second user equipment to the first user equipment via the local tunnel, wherein the local tunnel refers to headers originally used for routing the network packets between the first user equipment and the second user equipment that is configured to be changed by the second base station and the first base station.

36. The method for data traffic offload of claim 35, wherein the first base station and the second base station are located on the front-end network, and wherein the first user equipment establishes connection to the mobile telecommunication network via the second base station.

37. The method for data traffic offload of claim 36, wherein the step of creating the local tunnel comprises:

creating the local tunnel according to a network address of the first base station and the network address of the second base station.

38. The method for data traffic offload of claim 35, wherein the record is stored in a database, and wherein the database is located on the front-end network or the mobile telecommunication network.

39. The method for data traffic offload of claim 35, further comprising:

paging the second user equipment; and establishing connection with the second user equipment.

40. The method for data traffic offload of claim 35, further comprising:

executing a corresponding handover procedure and deleting the local tunnel due to the second user equipment moving to a service range of a third base station and changing to be served by the third base station, wherein the third base station is located on the front-end network.

41. The method for data traffic offload of claim 35, further comprising:

deleting the local tunnel due to disconnection of the second user equipment from the mobile telecommunication network and/or network packets unable to transmit to the second user equipment.

* * * * *